S. T. EDMONSON.
HAY PRESS.
APPLICATION FILED AUG. 14, 1918.
1,305,784.
Patented June 3, 1919.
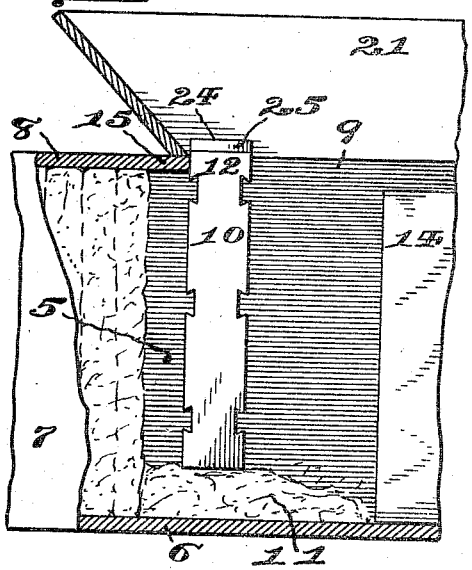
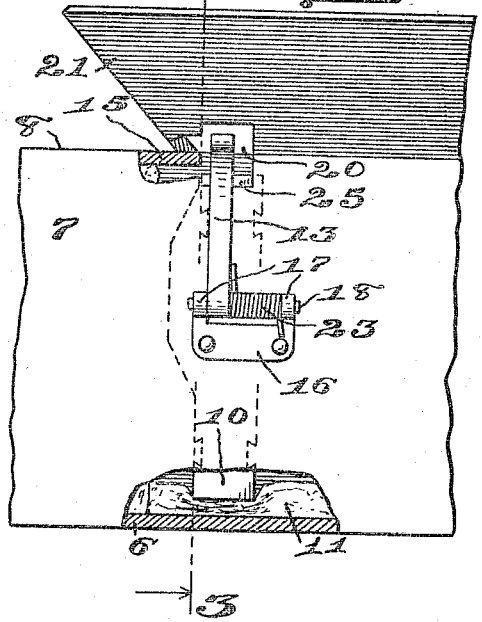
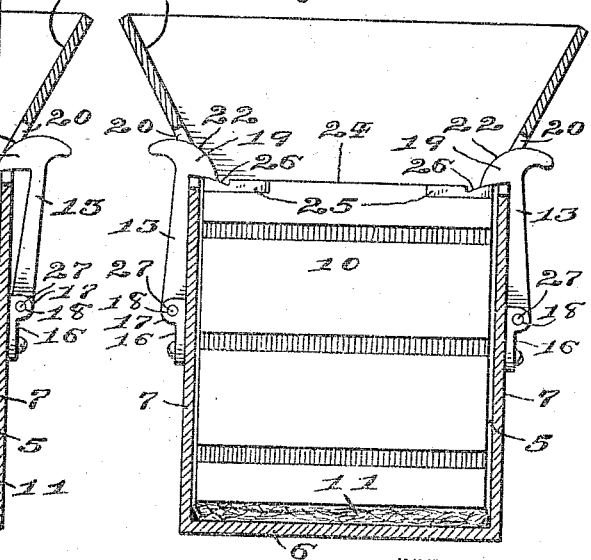
INVENTOR:
Seth T. Edmonson.
BY
Frank P. Shepard.
ATTORNEY.

UNITED STATES PATENT OFFICE.

SETH T. EDMONSON, OF COYLE, OKLAHOMA.

HAY-PRESS.

1,305,784.

Specification of Letters Patent. Patented June 3, 1919.

Application filed August 14, 1918. Serial No. 249,756.

*To all whom it may concern:*

Be it known that I, SETH T. EDMONSON, a citizen of the United States, residing at Coyle, in the county of Logan and State of Oklahoma, have invented certain new and useful Improvements in Hay-Presses, of which the following is a specification, reference being had to the accompanying drawings.

In the operation of a hay press, loose hay on the bottom of the press-chamber often holds a division-block up so that its upper end is jammed against the edge of the feeding opening by the forward stroke of the plunger.

The object, therefore, of this invention is to overcome the above difficulty.

The drawings show one of the practical forms in which the invention may be embodied.

Figure 1 is a fragmental side elevation, mostly in section, of an ordinary hay press, and shows a division-block held up by loose hay on the bottom of the press-chamber.

Fig. 2 is an elevation view in the same direction as Fig. 1, showing improved means for holding the division-block down.

Fig. 3 is a cross-section view taken on the line 3—3 of Fig. 2, but with the division-block just entering the press-chamber.

Fig. 4 is a cross-section view on the same line 3—3, with the parts in the same position as in Fig. 2.

Like characters of reference designate like parts in all the figures, except that some characters appearing in certain figures are omitted in others to avoid confusion.

The press-chamber 5 shown in this instance is inclosed by the lower wall 6, the side walls 7, and the upper wall 8; the upper wall being limited to form a feeding opening 9.

In Fig. 1, a division-block 10 is shown partly inserted in the press-chamber 5 through the feeding opening 9, this division-block being held up by loose hay 11 lying on the bottom 6, in such position that its upper end 12 projects up out of the feeding opening beyond the upper wall 8.

In carrying out the object stated, the inventor places upon some suitable part of the hay press a detent 13 in position to engage some suitable portion of the division-block 10 after the latter has been thrust downward manually or otherwise entirely to proper place in the press-chamber 5; said detent being arranged to automatically engage the division-block and hold it down in opposition to the lifting force of the hay 11 until the plunger 14 has forced said division-block forward under the edge 15 of the upper wall 8.

In this instance, two detents 13 are shown, one being pivoted to the outer surface of one side wall 7 and the other to the outer surface of the opposite side wall.

In pivoting the detents 13, plates 16, having spaced pivotal lugs 17, may be riveted to the outer surfaces of the side walls 7; a pivot-pin 18 being passed through said lugs and through the detents.

In this instance the detents 13 project upward on the outside of the side walls 7, and the upper ends of said detents are formed with hooks 19 which engage the upper edge of the division-block 10 through openings 20 formed by cutting away the upper edges of the side walls 7 and lower portions of the hopper 21.

The upper surfaces of the hooks 19 are so sloped that the downward thrust of a division-block 10 into the press-chamber 5 will swing the detents 13 outward to the position shown in Fig. 3 and allow the division-block to pass downward.

Each detent 13 is yieldably held inward toward the division-block 10 by a helical spring 23 which is coiled about its pivot-pin 18, and when the division-block 10 has been thrust entirely down to place in the position shown in Figs. 2 and 4 said spring swings said detents inward to where their hooks 19 hook over the upper edge 24 of the division-block and positively hold said division-block down.

The end portions of the upper edge 24 of the division-block 10 may be armored with metal blocks 25, so as not to be worn away by being repeatedly slid forward from under said detents by the plunger 14; and the surfaces 26 of said blocks 25 engaged by the detents should be so curved or inclined with respect to the pivot points 27 of said detents that the latter will not tend to unhook.

The following is claimed:—

1. In a hay press, a press-chamber having an opening for a division-block, holding means carried by the press-chamber, said holding means being arranged to allow free entering movement of the division-block and to positively resist outward movement of said division-block.

2. In a hay press, a press-chamber having an entrance opening for a division-block, holding means carried by the press-chamber, said holding means including a member movable across the path of entering movement of the division-block.

3. In a hay press, a press-chamber having an entrance opening for a division-block, holding means carried by the press-chamber, said holding means including a member movable across the path of movement of the division-block, and yieldable means for holding said member in said path.

4. In a hay press, a press-chamber having an entrance opening for a division-block, holding means carried by the press-chamber, said holding means including a member movable across the path of entering movement of the division-block, and yieldable means for holding said member in said path, the outer surface of said member being so shaped that an entering division-block may pass it unresisted.

5. In a hay press, a press-chamber having an entrance opening for a division-block, and a detent pivoted to the press-chamber to hold said division-block against outward movement after being inserted in the press-chamber.

Witness my hand this 9th day of April, 1918.

SETH T. EDMONSON.

Copies of this patent may be obtained for five cents each, by addressing the "Commissioner of Patents, Washington, D. C."